United States Patent
Ramdas

(10) Patent No.: US 10,402,312 B2
(45) Date of Patent: Sep. 3, 2019

(54) SOURCE CODE VALIDATION TOOL

(71) Applicant: BANK OF AMERICA CORPORATION, Charlotte, NC (US)

(72) Inventor: Rachit Ramdas, Yardley, PA (US)

(73) Assignee: Bank of America Corporation, Charlotte, NC (US)

(*) Notice: Subject to any disclaimer, the term of this patent is extended or adjusted under 35 U.S.C. 154(b) by 239 days.

(21) Appl. No.: 15/270,170

(22) Filed: Sep. 20, 2016

(65) Prior Publication Data

US 2018/0081794 A1  Mar. 22, 2018

(51) Int. Cl.
| | |
|---|---|
| G06F 11/36 | (2006.01) |
| G06F 16/11 | (2019.01) |
| G06F 17/22 | (2006.01) |
| G06F 17/27 | (2006.01) |

(52) U.S. Cl.
CPC ........ G06F 11/3688 (2013.01); G06F 16/116 (2019.01); G06F 17/2247 (2013.01); G06F 17/2725 (2013.01)

(58) Field of Classification Search
CPC ............... G06F 11/3688; G06F 17/272; G06F 17/30076
See application file for complete search history.

(56) References Cited

U.S. PATENT DOCUMENTS

| | | | |
|---|---|---|---|
| 2003/0121000 A1* | 6/2003 | Cooper | G06F 8/51 715/234 |
| 2006/0184918 A1* | 8/2006 | Rosaria | G06F 11/3672 717/124 |
| 2011/0010685 A1* | 1/2011 | Sureka | G06F 8/34 717/102 |
| 2015/0082090 A1* | 3/2015 | Holden | G06F 11/2294 714/25 |
| 2015/0213268 A1* | 7/2015 | Nance | G06F 21/577 726/1 |
| 2016/0019132 A1* | 1/2016 | Vilakkumadathil | G06F 9/44589 717/126 |

* cited by examiner

*Primary Examiner* — Wei Y Zhen
*Assistant Examiner* — Amir Soltanzadeh
(74) *Attorney, Agent, or Firm* — Michael A. Springs

(57) ABSTRACT

A source code validation tool includes a source code database monitor, a parser, a file converter, a source code validator, and an alert engine. The source code database monitor detects that a change has occurred to a source code file. In response, the file converter transforms the source code file into an extensible markup language file. The parser extracts a plurality of words from the extensible markup language file. The parser also compares each word of the plurality of words against a naming convention and determines whether each word follows the naming convention based on the comparison. The source code validator determines a plurality of tests that should be executed against the source code file and determines whether each test of the plurality of tests passed. The alert engine communicates a message indicating whether a word did not follow the naming convention and a test failed.

15 Claims, 3 Drawing Sheets

SOURCE CODE VALIDATION TOOL

TECHNICAL FIELD

This disclosure relates generally to source code validation.

BACKGROUND

Applications and other software are developed by various enterprises. Even though an application may appear simple, it could involve several thousands or millions of lines of source code distributed across hundreds of source code files.

SUMMARY OF THE DISCLOSURE

According to an embodiment, a source code validation tool includes a source code database monitor, a parser, a file converter, a source code validator, and an alert engine. The source code database monitor detects that a change has occurred to a source code file. In response to the source code database monitor detecting that the change has occurred to the source code file, the file converter transforms the source code file into an extensible markup language file. The parser extracts a plurality of words from the extensible markup language file. The parser also compares each word of the plurality of words against a naming convention and determines whether each word of the plurality of words from the extensible markup language file follows the naming convention based on the comparison. The source code validator determines, based on the extensible markup language file, a plurality of tests that should be executed against the source code file and determines whether each test of the plurality of tests passed. The alert engine communicates a message indicating at least one of a word of the plurality of words did not follow the naming convention and a test of the plurality of tests failed.

Certain embodiments provide one or more technical advantages. For example, an embodiment reduces errors in applications by ensuring that appropriate tests are executed against source code files. As another example, an embodiment improves the speed and efficiency of the compilation process by ensuring that the source code files follow naming conventions. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
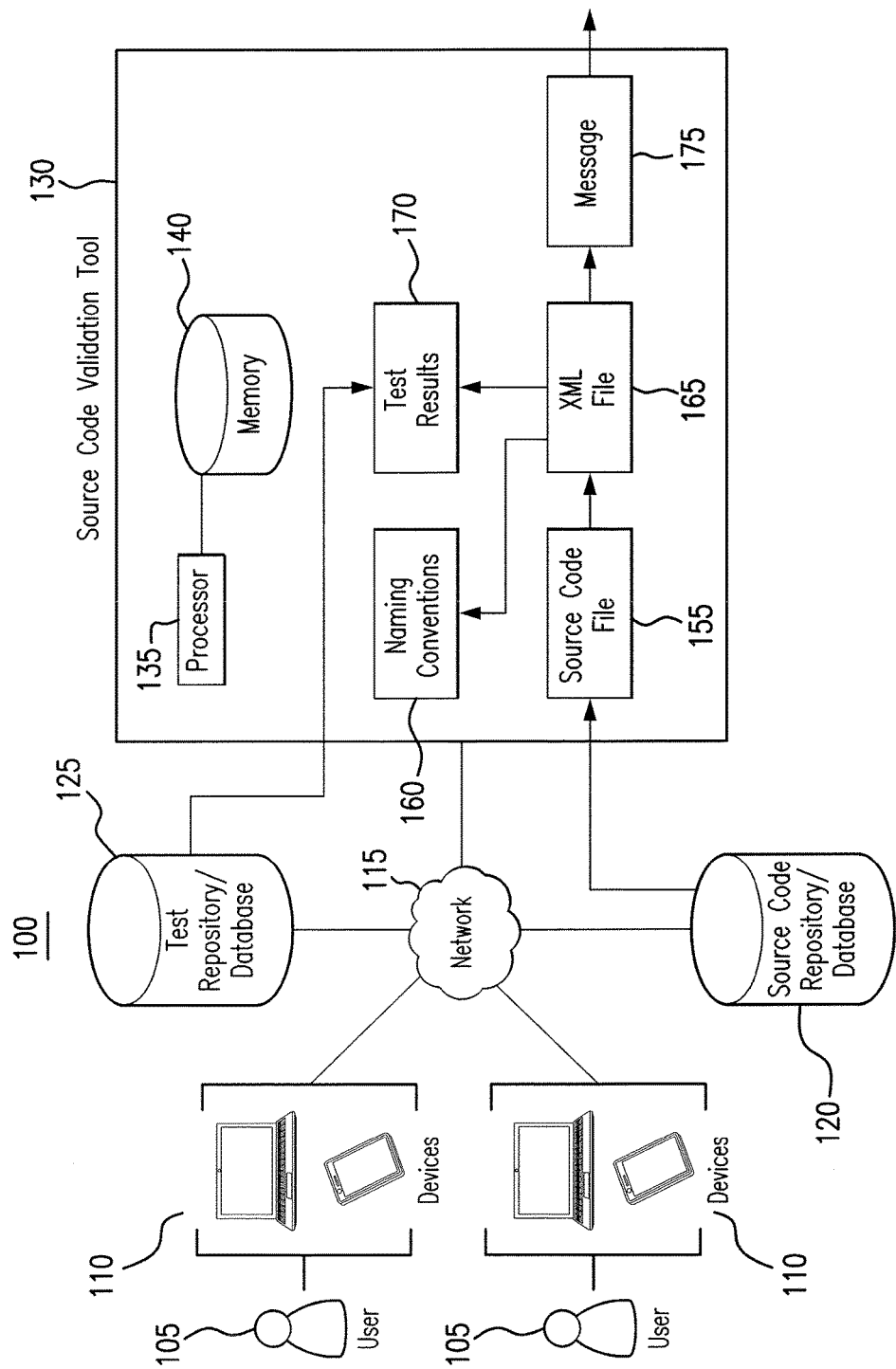
FIG. 1 illustrates a system for validating source code.
Figure 2:
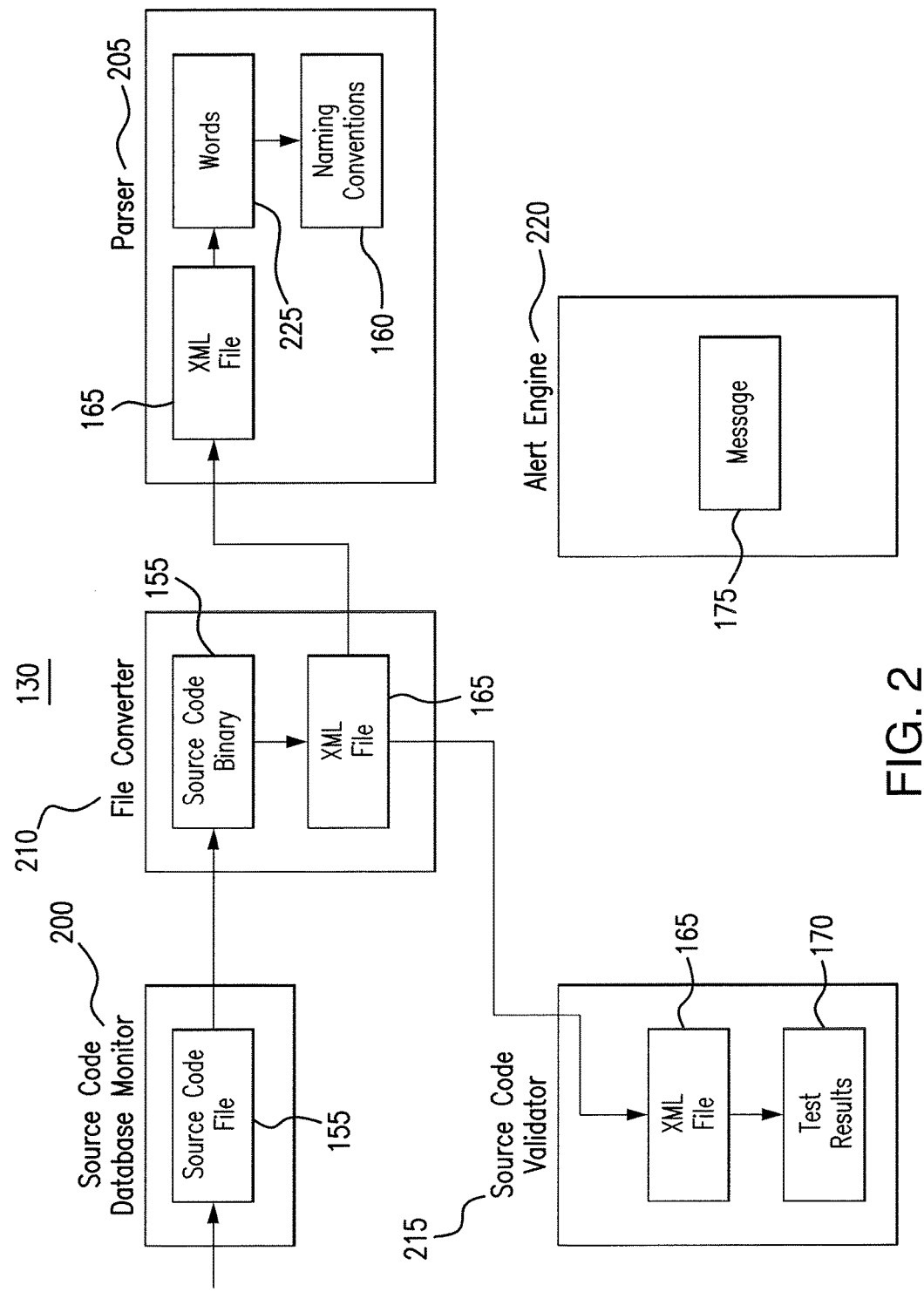
FIG. 2 illustrates the source code validation tool of the system of FIG. 1.
Figure 3:
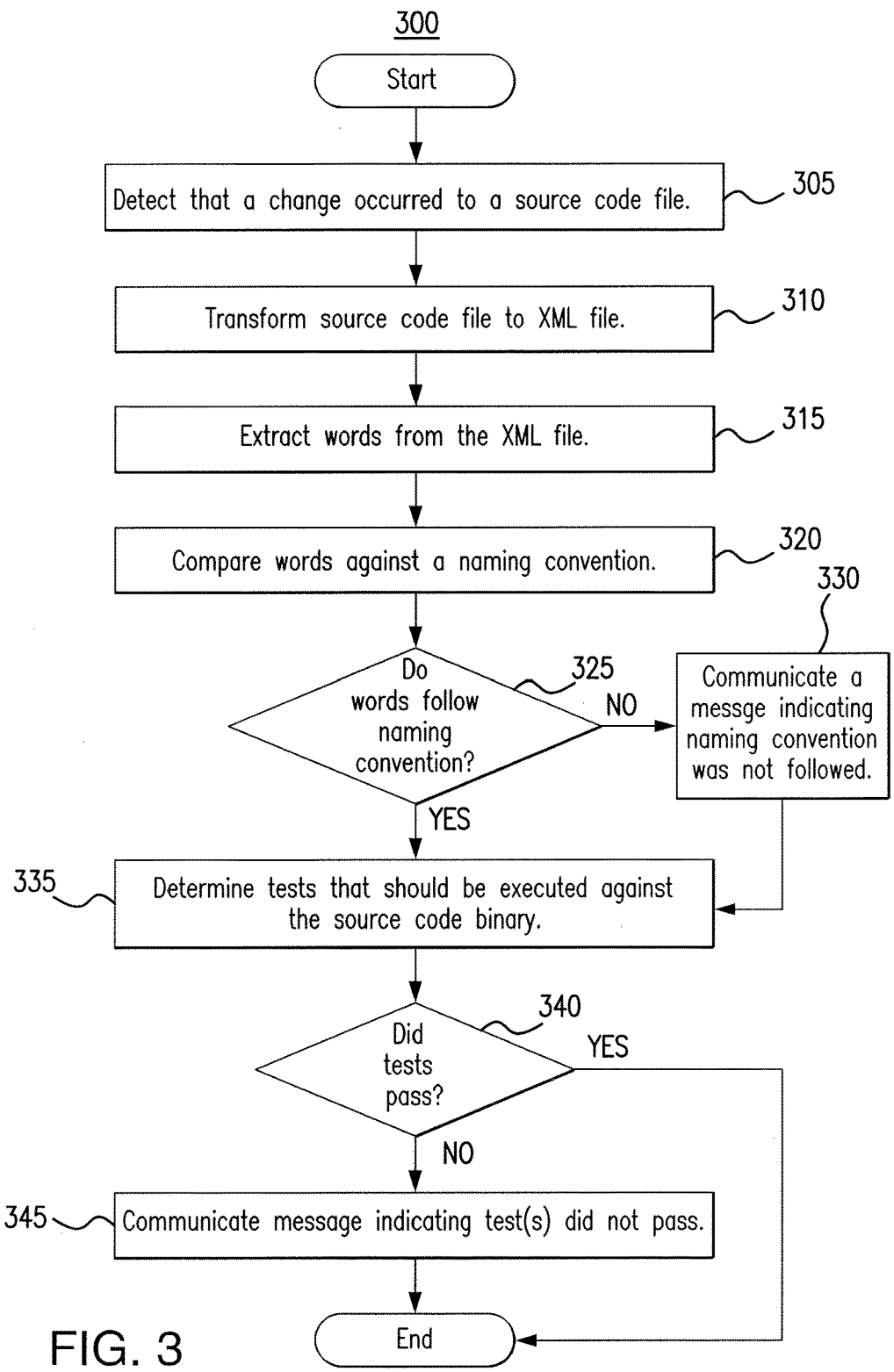
FIG. 3 is a flowchart illustrating a method for validating source code using the system of FIG. 1.

Embodiments of the present disclosure and its advantages are best understood by referring to FIGS. 1 through 3 of the drawings, like numerals being used for like and corresponding parts of the various drawings.

Applications and other software are developed by various enterprises. Even though an application may appear simple, it could involve several thousands or millions of lines or source code distributed across hundreds of source code files. Each source code file may be developed by a different developer in the enterprise. As each developer changes and/or updates the source code files, each developer may upload the source code file to a central repository or database. The source code files in the central repository may be compiled to produce the application.

Before a developer uploads a changed source code file to the central repository, the developer may execute a series of tests against the changed source code file to ensure that the changes will not cause an error and/or break the source code in the central repository. If the test revealed that the change will cause an error and/or break the code, then the developer may need to fix the error and/or break before uploading the code to the central repository. In some instances, however, the developer may forget to execute the test and/or the test may execute improperly. For example, the developer may execute the test in an incorrect environment and/or may forget to run the test entirely. As a result, compilation may fail or throw errors. Additionally, the compiled application may include errors and/or behave inappropriately.

During development, the enterprise may have certain naming conventions for each developer to follow while updating the source code files. For example, the naming conventions may require that certain variables be named a certain way in the source code files. As another example, the naming conventions may require that certain constants and/or parameters be named in a certain format. As the developers change and/or update the source code files, the developers may follow these naming conventions so that subsequent developers who work on the source code files may understand and/or interpret the code properly. In some instances, however, the developers may forget to follow the naming conventions and/or name certain portions of the source code file incorrectly. As a result, the code may not compile correctly and/or may cause other developers to not understand the code. These errors present technical challenges to the software development process.

This disclosure contemplates a source code validation tool that addresses these technical challenges faced during software development and compilation. For example, the source code validation tool may automatically review source code files to ensure that the source code follows particular naming conventions. As another example, the source code validation tool may automatically scan source code files to determine which test should be executed against the source code files. Then, the source code validation tool may ensure that these tests have been executed against the source code files and that they passed. In certain embodiments, the source code validation tool improves the compilation process by reducing the number of breaks and/or errors encountered during compilation. The source code validation tool may reduce the number of errors during compilation by ensuring that the source code files follow naming conventions and ensure that the proper tests have been executed against the source code files. In some embodiments, the source code validation tool reduces the number of errors in the software applications by ensuring that the appropriate tests are executed against the source code files. In some embodiments, the source code validation tool performs a physical transformation of data by converting source code binaries into extensible markup language files. The source code validation tool then reviews the extensible markup language files to determine which tests should be executed against the source code binaries.

The source code validation tool will be described in more detail using FIGS. 1 through 3. FIG. 1 will describe the source code validation tool generally. FIGS. 2 and 3 will describe the source code validation tool in more detail.

FIG. 1 illustrates a system 100 for validating source code. As illustrated in FIG. 1, system 100 includes one or more devices 110, a network 115, a source code repository and/or database 120, a test repository and/or database 125, and a source code validation tool 130. In certain embodiments, source code validation tool 130 improves the compilation process by ensuring that source code files follow naming conventions and that the proper tests have been executed against the source code files. In this manner, source code validation tool 130 reduces the number of errors during compilation and the number of errors in the compiled application.

Device 110 may be any apparatus that user 105 can use to develop applications by generating and/or updating source code. In some embodiments, devices 110 may be any apparatus that users 105 can use to issue commands and to receive output from source code validation tool 130. Devices 110 may be used to communicate with any components of system 100. For example, devices 110 may retrieve updates and/or upload source code files to source code repository 120. As another example, devices 110 may execute tests against source code files and upload the results of those tests to test repository 125. As yet another example, devices 110 may issue commands to source code validation tool 130 and/or receive messages from source code validation tool 130.

This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Source code repository and/or database 120 may be any storage that stores source code files. In certain embodiments, devices 110 may produce the source code files and upload the source code files to source code repository 120. When devices 110 update source code files, devices 110 may retrieve source code files from source code repository 120, update the source code files, and upload the updated source code files to source code repository 120. When source code files are updated and/or changed, source code repository 120 may notify source code validation tool 130. In some embodiments, source code validation tool 130 may monitor source code repository 120 and detect when changes to source code files have occurred. During the compilation process, source code from source code repository 120 may be retrieved and compiled to produce a software application.

Test repository and/or database 125 may be any storage that stores tests to be executed against source code and/or the results of tests that are executed against the source code. When devices 110 update and/or produce source code files, devices 110 may retrieve tests from test repository 125. Devices 110 may then execute these tests against the source code. The results of these tests may then be uploaded to test repository 125. The results may be reviewed by source code validation tool 130 to ensure that the appropriate tests have been executed against the source code before the source code is compiled.

Source code validation tool 130 validates source code by ensuring that the appropriate naming conventions are followed and that appropriate tests are executed against the source code. As illustrated in FIG. 1, source code validation tool 130 includes a processor 135 and a memory 140. This disclosure contemplates processor 135 and memory 140 being configured to perform any of the tasks of source code validation tool 130 described herein. In certain embodiments, source code validation tool 130 improves the compilation process by ensuring that naming conventions are followed and that appropriate tests are executed against the source code before the source code is compiled. In some embodiments, source code validation tool 130 reduces the number of errors in a software application by ensuring that appropriate tests are executed against the source code before the source code is compiled into the application.

Processor 135 is any electronic circuitry, including, but not limited to microprocessors, application specific integrated circuits (ASIC), application specific instruction set processor (ASIP), and/or state machines, that communicatively couples to memory 140 and controls the operation of source code validation tool 130. Processor 135 may be 8-bit, 16-bit, 32-bit, 64-bit or of any other suitable architecture. Processor 135 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 135 may include other hardware and software that operates to control and process information. Processor 135 executes software stored on memory to perform any of the functions described herein. Processor 135 controls the operation and administration of disaster recovery tool 130 by processing information received from network 115, device(s) 110, and memory 140. Processor 135 may be a programmable logic device, a microcontroller, a microprocessor, any suitable processing device, or any suitable combination of the preceding. Processor 135 is not limited to a single processing device and may encompass multiple processing devices.

Memory 140 may store, either permanently or temporarily, data, operational software, or other information for processor 135. Memory 140 may include any one or a combination of volatile or non-volatile local or remote devices suitable for storing information. For example, memory 140 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 140, a disk, a CD, or a flash drive. In particular embodiments, the software may include an application executable by processor 135 to perform one or more of the functions described herein.

Source code validation tool 130 may detect when source code in source code repository 120 has been changed and/or updated. In response to such a determination, source code validation tool 130 retrieves a source code file 155 from source code repository 120. Source code file 155 may include the changes and/or updates to a particular piece of source code. Source code validation tool 130 may automatically perform various checks on source code file 155 to reduce the number of errors in the eventual software application and during compilation. This disclosure contemplates source code file 155 being in any appropriate format, including binary and non-binary formats.

Source code validation tool 130 may ensure that proper tests are executed against source code file 155 before source code file 155 is compiled. In certain embodiments, source code validation tool 130 converts source code file 155 into an extensible markup language (XML) file 165. Source code validation tool 130 may review XML file 165 to determine which tests should be executed against source code file 155. For example, XML file 165 may indicate that five tests should be executed against source code file 155. Source code validation tool 130 may retrieve test results 170 from test repository 125 based on the review of XML file 165. Using the previous example, source code validation tool 130 may retrieve test results 170 for the five tests that should be executed against source code file 155. Source code validation tool 130 may then review test results 175 to ensure that the tests pass and/or that the tests were executed. If source code validation tool 130 determines that a test was not executed against source code file 155 and/or that a test failed, source code validation tool 130 may generate a message indicating that a test should be executed and/or that a test failed. Users 105 may fix source code file 155 based on the message.

Source code validation tool 130 may review XML file 165 to ensure that source code file 155 follows proper naming conventions. In certain embodiments, source code validation tool 130 may compare certain words of XML file 165 against naming conventions 160 to see if those words follow naming conventions 160. For example, naming conventions 160 may require that variables start with a certain character and be limited to a certain length. Source code validation tool 130 may extract the variables from XML file 165 and check whether those variables start with the particular letter and whether they exceed the length limit indicated by naming conventions 160. If any of the variables do not follow naming conventions 160, source code validation tool 130 may generate a message indicating the variables that do not follow naming conventions 160. In response to that message, users 105 may change the naming of the variables that do not follow naming conventions 160 so that they follow naming conventions 160. In this manner, source code validation tool 130 ensures that certain portions of source code file 155 follow naming conventions 160. As a result, errors in the resulting software application may be reduced because source code file 155 becomes easier to understand and interpret by subsequent developers. This disclosure contemplates naming conventions 160 being any appropriate naming conventions that may be applied to any portion of source code file 155.

Source code validation tool 130 may generate message 175 to indicate to users 105 what changes need to be made to source code file 155. For example, message 175 may indicate the variables and/or words of source code file 155 that do not follow naming conventions 160. As another example, message 175 may indicate the tests that were not executed against source code file 155 and/or the tests that failed. In response, users 105 may update and/or change source code file 155 to follow naming conventions 160 and/or to pass certain tests. In certain embodiments, message 175 may request that source code file 155 be resubmitted because certain portions of source code file 155 did not follow naming conventions 160.

In some embodiments, source code validation tool 130 may validate script files in addition to source code binaries 155. For example, source code validation tool 130 may determine whether the script files follow naming conventions 160 and whether appropriate tests have been executed against the script file.

FIG. 2 illustrates the source code validation tool 130 of the system 100 of FIG. 1. As illustrated in FIG. 2, source code validation tool 130 includes a source code database monitor 200, a parser 205, a file converter 210, a source code validator 215, and an alert engine 220. In certain embodiments, source code validation tool 130 reduces the number of errors of a compiled application by ensuring that appropriate tests are executed against source code. In some embodiments, source code validation tool 130 improves the compilation process by ensuring that source code follows naming conventions. As a result, the number of errors that occur during compilation and during execution of the compiled application is reduced.

Source code database monitor 200 determines when source code has been changed and/or updated. For example, source code database monitor 200 may monitor a source code repository or database to determine when new source code and/or updated source code has been uploaded to the repository. In response to a determination that source code has been uploaded and/or changed, source code database monitor 200 may retrieve the changed and/or updated source code file 155. Source code validation tool 130 may then perform various checks on the retrieved source code file 155. An example algorithm for source code database monitor 200 is as follows: connect to source code repository; wait for source code to be uploaded to source code repository; detect that a certain source code file has been uploaded and/or changed; retrieve the uploaded and/or changed source code file from the source code repository.

File converter 210 converts source code file 155 into extensible markup language file 165. File converter 210 may receive source code file 155 from source code database monitor 200. File converter 210 may convert source code file 155 to XML file 165 so that source code validation tool 130 can determine which tests should be executed against source code file 155 and whether source code file 155 follows naming conventions. In particular embodiments, file converter 210 may perform a transformation of data when it transforms source code file 155 into XML file 165. An example algorithm for file converter 210 is as follows: receive source code file 155; convert source code file 155 into extensible markup language; aggregate extensible markup language into XML file 165; communicate XML file 165 to parser 205 and source code validator 215.

Parser 205 reviews XML file 165 to determine whether source code file 155 follows naming conventions 160. For example, parser 205 may extract words 225 from XML file 165. Words 225 may be any portion of XML file 165 such as, for example, variables, parameters, and/or any other portion of source code file 155 that is named by a developer. Parser 205 may compare words 225 against naming conventions 160 to ensure that words 225 follow naming conventions 160. If parser 205 determines that certain words 225 do not follow naming conventions 160, source code validation tool 130 may communicate a message 175 to developers alerting them that certain words 225 do not follow naming conventions 160. The developers may then change words 225 to follow naming conventions 160. An example algorithm for parser 205 is as follows: receive XML file 165 from file converter 210; parse XML file 165 to extract words 225; review words 225 to ensure that each word 225 follows naming convention 160; communicate an alert to alert engine 220 indicating which words 225 do not follow naming conventions 160.

In certain embodiments, parser 205 may review XML file 165 to determine a number of stages in source code file 155. Parser 205 may ensure that the number of stages do not exceed a threshold. In this manner, parser 205 may ensure that source code file 155 does not include too many stages which could slow down the compilation process. An example algorithm for this process is as follows: receive XML file 165; parse XML file 165 to isolate the number of stages in source code file 155; compare the number of stages against a threshold; communicate an alert to alert engine 220 if the number of stages exceeds the threshold.

In certain embodiments, parser 205 may determine whether source code file 155 includes a hard coded parameter. Parser 205 may communicate an alert to alert engine 220 if source code file 155 includes a hard coded parameter. The alert may identify the hard coded parameter. In response, a developer may remove the hard coded parameter. An example algorithm for this process is as follows: receive source XML file 165; parse XML file 165 to isolate hard coded parameters; communicate an alert to alert engine 220 to identify hard coded parameters.

In some embodiments, parser 205 may parse a script file to determine whether the script file follows naming conventions 160. For example, parser 205 may receive a script file and parse the script file in a manner similar to source code file 155 to isolate words from the script file. Parser 205 may then compare each of the words to naming conventions 160 to determine whether the words follow naming conventions 160. If the words do not follow naming conventions 160, parser 205 may communicate an alert to alert engine 220 identifying the words of the script file that do not follow naming conventions 160.

Source code validator 215 may receive XML file 165 and determine whether the appropriate tests have been executed against source code file 155. For example, source code validator 215 may review XML file 165 to determine which tests should have been executed against source code file 155. Source code validator 215 may then retrieve test results 170 from a test repository. Test results 170 may be the results for the tests that source code validator 215 determined should have been executed against source code file 155. Source code validator 215 may then review test results 170 to determine whether the determined tests have been executed against source code file 155 and whether those tests have passed. An example algorithm for source code validator 215 is as follows: receive XML file 165 from file converter 210; review XML file 165 to determine the tests that should be executed against source code file 155; retrieve test results 170 for those determined tests from a test repository; review test results 170 to determine whether each determine test has been executed; review test results 170 to determine whether each determined test passed; communicate an alert to alert engine 220 if a determined test was not executed or if a determined test failed.

Alert engine 220 generates message 175 to alert a user as to whether source code file 155 should be updated. For example, alert engine 220 may generate a message 175 indicating that source code file 155 did not follow naming conventions 160. As yet another example, alert engine 220 may generate a message 175 that indicates which tests should be executed against source code file 155. In response to receiving message 175, the user may update source code file 155 to follow naming conventions 160 and/or so that source code 155 passes certain tests. An example algorithm for alert engine 220 is as follows: receive alert from parser 205 and/or source code validator 215; generate a message 175 indicating that a word of source code file 155 did not follow naming conventions 160; generate a message indicating whether a test that should have been executed against source code file was not executed; generate a message indicating whether a test that was executed against source code file 155 failed.

FIG. 3 is a flowchart illustrating a method 300 for validating source code using the system 100 of FIG. 1. In certain embodiments, source code validation tool 130 performs method 300. By performing method 300, source code validation tool 130 reduces the number of errors in a compiled software application. Additionally, source code validation tool 130 improves the compilation process.

Source code validation tool 130 begins by detecting that a change occurred to a source code file in step 305. In step 310, source code validation tool 130 transforms the source code file to an extensible markup language file. Source code validation tool 130 extracts words from the XML file in step 315. Source code validation tool 130 compares these extracted words against the naming convention in step 320. In step 325, source code validation tool 130 determines whether the extracted words follow the naming convention. If the extracted words do not follow the naming convention, source code validation tool 130 communicates a message indicating that the naming convention was not followed in step 330. The message may indicate the extracted words that do not follow the naming convention.

Source code validation tool 130 then determines tests that should be executed against the source code file in step 335. Source code validation tool 130 may make this determination based on the XML file. In step 340, source code validation tool 130 may determine whether these tests pass. If the tests passed, then source code validation tool 130 may conclude method 300. If the tests did not pass, then source code validation tool 130 may proceed to step 345 to communicate a message indicating the test or tests that did not pass.

Modifications, additions, or omissions may be made to method 300 depicted in FIG. 3. Method 300 may include more, fewer, or other steps. For example, steps may be performed in parallel or in any suitable order. While discussed as source code validation tool 130 performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A source code validation tool comprising:
a source code database monitor configured to detect that a change has occurred to a source code file;
a file converter configured to transform the source code file into an extensible markup language file in response to the source code database monitor detecting that the change has occurred to the source code file;
a parser configured to:
extract a first plurality of words from the extensible markup language file;
compare each word of the first plurality of words against a naming convention; and
determine whether each word of the first plurality of words from the extensible markup language file follows the naming convention based on the comparison of each word of the first plurality of words against the naming convention;
isolate a second plurality of words in a script file;
compare each word of the second plurality of words against the naming convention; and
determine that a word of the second plurality of words from the script file does not follow the naming convention based on the comparison of each word of the second plurality of words against the naming convention;
in response to the determination that the word does not follow the naming convention, communicate an alert identifying the word;
a source code validator configured to:
determine, based on the extensible markup language file, a plurality of tests that should be executed against the source code file before the source code file is compiled;
determine whether each test of the plurality of tests passed before the source code file is compiled; and
determine whether a test of the plurality of tests was not executed against the source code file before the source code file is compiled; and
an alert engine configured to communicate a message indicating at least one of a word of the first plurality of words did not follow the naming convention, a test of the plurality of tests failed, and the test of the plurality of tests was not executed against the source code file.

2. The source code validation tool of claim 1, wherein the parser is further configured to parse the extensible markup language file before the source code validator determines the plurality of tests that should be executed against the source code file.

3. The source code validation tool of claim 1, wherein the alert engine is further configured to request that the source code file should be resubmitted in response to a determination that a word of the plurality of words did not follow the naming convention.

4. The source code validation tool of claim 1, wherein the parser is further configured to determine whether a number of stages in the extensible markup language file exceeds a threshold.

5. The source code validation tool of claim 1, wherein the parser is further configured to determine whether the extensible markup language file includes a hardcoded parameter.

6. A method comprising:
detecting that a change has occurred to a source code file;
in response to detecting that the change has occurred to the source code file, transforming the source code file into an extensible markup language file;
extracting a first plurality of words from the extensible markup language file;
comparing each word of the first plurality of words against a naming convention;
determining whether each word of the first plurality of words from the extensible markup language file follows the naming convention based on the comparison of each word of the first plurality of words against the naming convention;
isolating a second plurality of words in a script file;
comparing each word of the second plurality of words against the naming convention; and
determining that a word of the second plurality of words from the script file does not follow the naming convention based on the comparison of each word of the second plurality of words against the naming convention;
in response to the determination that the word does not follow the naming convention, communicating an alert identifying the word;
determining, based on the extensible markup language file, a plurality of tests that should be executed against the source code file before the source code file is compiled;
determining whether each test of the plurality of tests passed before the source code file is compiled;
determining whether a test of the plurality of tests was not executed against the source code file before the source code file is compiled; and
communicating a message indicating at least one of a word of the first plurality of words did not follow the naming convention, a test of the plurality of tests failed, and the test of the plurality of tests was not executed against the source code file.

7. The method of claim 6, wherein parsing the extensible markup language file happens before determining the plurality of tests that should be executed against the source code file.

8. The method of claim 6, further comprising requesting that the source code file should be resubmitted in response to a determination that a word of the plurality of words did not follow the naming convention.

9. The method of claim 6, further comprising determining whether a number of stages in the extensible markup language file exceeds a threshold.

10. The method of claim 6, further comprising determining whether the extensible markup language file includes a hardcoded parameter.

11. A system comprising:
a device configured to upload a change to a source code file to a database;
a source code validation tool configured to:
detect that the change has occurred to the source code file;
in response to detecting that the change has occurred to the source code file, transform the source code file into an extensible markup language file;
extract a first plurality of words from the extensible markup language file;
compare each word of the first plurality of words against a naming convention;
determine whether each word of the first plurality of words from the extensible markup language file follows the naming convention based on the comparison of each word of the first plurality of words against the naming convention;

isolate a second plurality of words in a script file;

compare each word of the second plurality of words against the naming convention; and determine that a word of the second plurality of words from the script file does not follow the naming convention based on the comparison of each word of the second plurality of words against the naming convention;

in response to the determination that the word does not follow the naming convention, communicate an alert identifying the word;

determine, based on the extensible markup language file, a plurality of tests that should be executed against the source code file before the source code file is compiled;

determine whether each test of the plurality of tests passed before the source code file is compiled;

determine whether a test of the plurality of tests was not executed against the source code file before the source code file is compiled; and communicate a message indicating at least one of a word of the first plurality of words did not follow the naming convention, a test of the plurality of tests failed, and the test of the plurality of tests was not executed against the source code file.

12. The system of claim 11, wherein the source code validation tool is further configured to parse the extensible markup language file before determining the plurality of tests that should be executed against the source code file.

13. The system of claim 11, wherein the source code validation tool is further configured to request that the source code file should be resubmitted in response to a determination that a word of the plurality of words did not follow the naming convention.

14. The system of claim 11, wherein the source code validation tool is further configured to determine whether a number of stages in the extensible markup language file exceeds a threshold.

15. The system of claim 11, wherein the source code validation tool is further configured to determine whether the extensible markup language file includes a hardcoded parameter.

* * * * *